Nov. 23, 1937.   E. J. GRAHAM   2,100,214
ADJUSTABLE SPEED LIMIT INDICATOR
Original Filed March 28, 1936
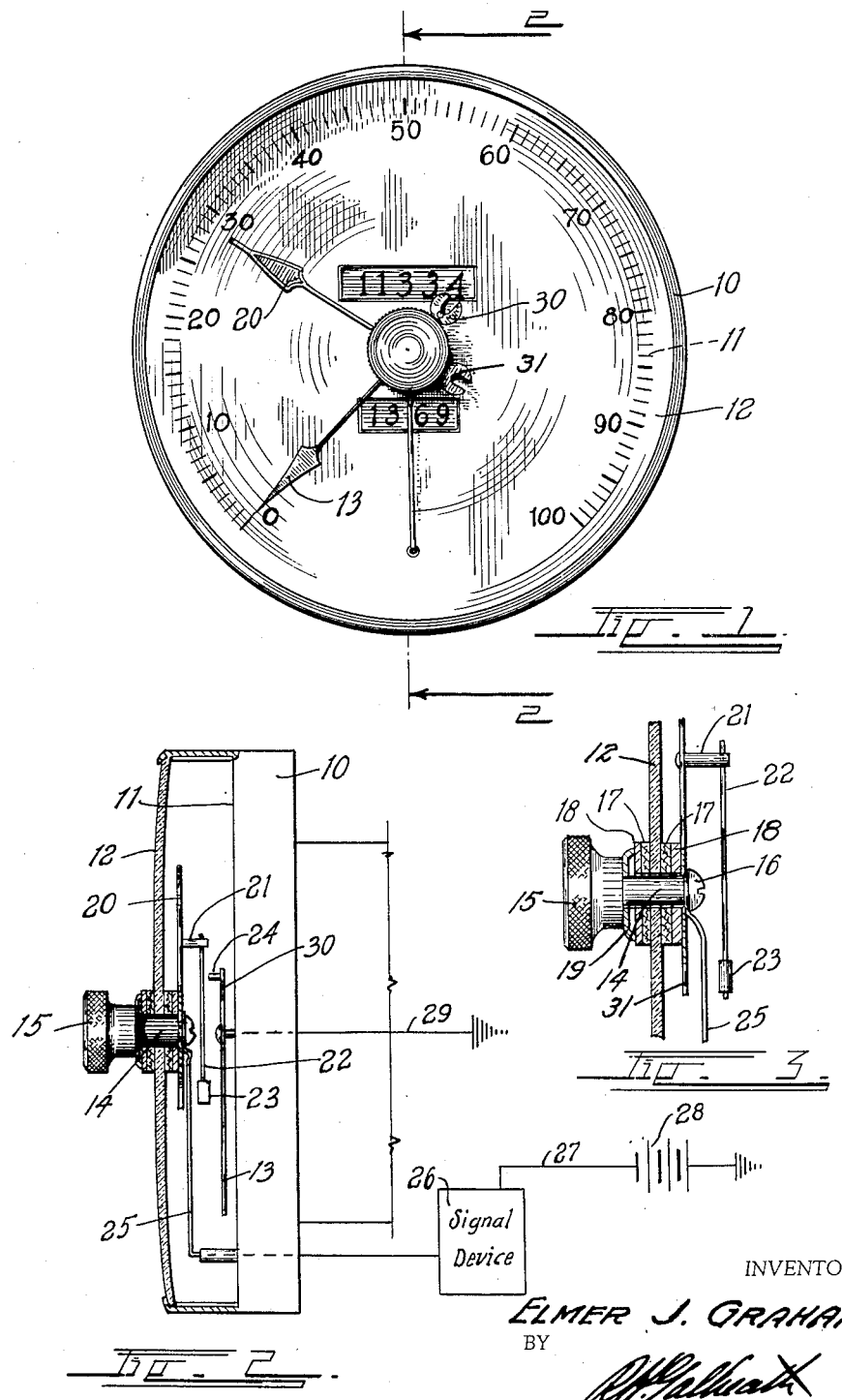
INVENTOR.
ELMER J. GRAHAM
BY
ATTORNEY.

Patented Nov. 23, 1937

2,100,214

UNITED STATES PATENT OFFICE 2,100,214

ADJUSTABLE SPEED LIMIT INDICATOR

Elmer J. Graham, Denver, Colo., assignor of one-half to Leslie H. Rees, Denver, Colo.

Application March 28, 1936, Serial No. 71,479
Renewed October 5, 1937

1 Claim. (Cl. 200—56)

This invention relates to an adjustable speed limit indicator for automotive vehicles, and has for its principal object the provision of a simple, highly efficient device which can be preset by the driver of an automobile at the maximum speed limit and which will give a warning signal or cut off the ignition of the automobile, when the preset limit is reached without further attention of the operator.

Another object of the invention is to so construct the device that it can be applied to present speedometers without affecting, or requiring any change in, the speedometer mechanism.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 illustrates the improved speed limit indicator applied to a speedometer dial.

Fig. 2 is a vertical section through the indicating portion of the device, taken on the line 2—2, Fig. 1.

Fig. 3 is an enlarged sectional view of the axial portion of Fig. 2.

A typical speedometer is indicated at 10 with its dial at 11, cover glass at 12 and speed indicating hand at 13.

In applying the present invention to the speedometer, the cover glass is provided with a central opening for the passage of an adjusting stud 14, preferably formed with a knurled finger knob 15. Against each face of the cover glass, a felt washer 17 is placed and over each felt washer is a metal washer 18. A spring washer 19 is placed beneath the knob 15 and the entire assembly is clamped to the glass 12 by means of a clamp screw 16, which is threaded into the extremity of the stud 14. A speed limit hand 20 is clamped beneath the head of the screw 16 so that it must rotate with the stud 14.

The rear extremities of the hands 13 and 20 are projected beyond their axis points as indicated at 30 and 31, respectively. A spring stud 21 projects inwardly from the back of the hand 20. A light, straight wire spring 22 is supported by the stud 21 so that it will extend parallel to the back of the hand 20 across the axis of the speedometer, terminating in a contact 23 which is concealed by the rear extremity 31. The speedometer hand 13 is provided with a forwardly extending contact stud 24 of sufficient length to contact with the back of the contact 23, when the two hands pass each other.

A flexible electrical conductor 25 leads from the clamp screw 16 to any suitable signal or control device, such as diagrammatically indicated at 26. The signal or control device is connected by means of a suitable conductor 27 to the car battery, diagrammatically indicated at 28. The battery 28 is of course grounded at its opposite terminal as is usual in motor car design, and the speedometer 10 is naturally grounded such as indicated diagrammatically at 29.

Let us assume that a driver does not wish to exceed a speed of thirty miles per hour. By means of the knob 15, he sets the hand 20 at thirty on the speedometer dial 11. As the car speed increases, the hand 13 approaches the hand 20 and the rear extremity 30 of the hand 13 swings the contact 24 toward the contact 23. At the time that the hand 13 passes directly under the hand 20, the contact 24 will be directly under the contact 23 and will have lifted the latter so as to slightly flex the spring wire 22. This closes a circuit from the ground 29 through the hand 13, the contact 24, the contact 23, the spring 22, the stud 21, the hand 20, the conductor 25 to the signal device 26, thereby giving warning to the operator that the preset speed of thirty miles per hour has been reached.

If the device of 26 is simply a signal device, that is a light or a sound producing device, the driver may still increase his speed if he desires. This allows the contact 24 to pass from under the contact 23 so that the hand 13 may indicate the increased speed. No further indication will be given until the speed drops down to the preset speed, at which time the signal contacts will again close.

As before stated, the signal device 26 may be employed to short circuit the ignition system of the automobile if desired so that it will be impossible for a driver to exceed the preset speed limit.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:—

In a speed indicating device having a dial and a speedometer hand for indicating positions on said dial, means for closing an electrical circuit when said speedometer hand reaches certain positions on said dial comprising: a setting hand pivotally mounted in axial alignment with said speedometer hand; a spring stud projecting inwardly from said setting hand toward said speedometer hand; a spring arm extending from said stud parallel to said setting hand across the axis thereof; a first contact on the latter extremity of said spring arm; a rear extremity on said speedometer hand positioned diametrically opposite to the latter; a contact stud extending forwardly from said rear extremity, said first contact having a cylindrical surface said contact stud terminating in the path of said surface so that the latter will slide past said stud while flexing said spring as said two hands pass each other; and means for placing said contacts in an electric signal circuit.

ELMER J. GRAHAM.